United States Patent [19]
Vogt et al.

[11] Patent Number: 4,719,197
[45] Date of Patent: Jan. 12, 1988

[54] PROCESS FOR MAKING A CARRIER-SUPPORTED CATALYST

[75] Inventors: Wilhelm Vogt, Hürth; Hermann Glaser, Erftstadt; Eitel Goedicke, Bergheim, all of Fed. Rep. of Germany

[73] Assignee: Hoechst AG, Hurth Knapsack, Fed. Rep. of Germany

[21] Appl. No.: 922,058

[22] Filed: Oct. 22, 1986

[30] Foreign Application Priority Data

Nov. 5, 1985 [DE] Fed. Rep. of Germany ....... 3539125

[51] Int. Cl.$^4$ .................. B01J 23/42; B01J 23/44; B01J 23/46
[52] U.S. Cl. .................................. 502/339; 502/325
[58] Field of Search .............. 502/325, 332, 333, 334, 502/339; 423/213.5

[56] References Cited

U.S. PATENT DOCUMENTS

| 4,206,087 | 6/1980 | Keith et al. | 502/304 |
| 4,407,735 | 10/1983 | Sawamura | 502/304 X |
| 4,587,231 | 5/1986 | Sawamura et al. | 502/304 |

Primary Examiner—W. J. Shine

[57] ABSTRACT

A carrier-supported catalyst is made by impregnating a ceramic honeycomb structure having a layer of a heat resistant metal oxide applied to it with the aqueous solution of at least one metal selected from platinum, rhodium and palladium, drying the impregnated honeycomb structure and annealing it. More particularly a drying gas regularly distributed across the entire cross-sectional area of the impregnated honeycomb structure is passed therethrough at 20° to 400° C. The temperature and quantity of drying gas are selected so that water ceases to be evaporated from the impregnated honeycomb structure after 30 to 300 seconds and the dried impregnated honeycomb structure is heat-treated over a period of 1 to 3 hours at temperatures up to 1000° C.

5 Claims, No Drawings

PROCESS FOR MAKING A CARRIER-SUPPORTED CATALYST

This invention relates to a process for making a carrier-supported catalyst by impregnating a ceramic honeycomb structure coated with a heat-resistant metal oxide with the aqueous solution of at least one soluble compound of platinum, rhodium or palladium and, if desired, a salt of a non-noble metal, drying the impregnated honeycomb structure and annealing it.

It has been described that noble metal catalysts can be made by subjecting a ceramic honeycomb structure coated with an aluminum oxide layer to impregnation. To repress the chemisorptive part in this treatment, it is necessary to use either an impregnating solution with a pH of from 1 to 2 containing one or more iron, nickel, cerium or zirconium salts improving the catalytic activity, or an impregnating solution with a pH of about 10 containing a complex former, such as nitrilotriacetic acid or ethylene diaminotetraacetic acid. These are two impregnating methods in which the noble metals and non-noble metal salts on drying the impregnated honeycomb structures are found to deposit predominantly at places toward which wick effects caused the impregnating solution to migrate, immediately before the salts contained in it commence depositing. In other words, these two impregnating methods permit a honeycomb structure to be regularly impregnated only when the water becomes evaporated regularly everywhere in the honeycomb structure. This is a strict requirement which a honeycomb structure has to comply with, especially in radial direction; the reason resides in the fact that areas where the active ingredients are inadequately concentrated in radial direction are liable on flowing a gas mixture through the honeycomb structure, to act in a manner similar to a partial bypass.

It is therefore highly desirable to have a process for making a carrier-supported catalyst by impregnating a ceramic honeycomb structure with the aqueous solution of at least one noble metal compound and, if desired, a non-noble metal salt, wherein the phenomenon of areas of inadequate concentration, especially in radial direction, is not liable to occur. To this end, the invention provides: for a drying gas to be passed at 20° to 400° C. through the impregnated honeycomb structure so as to be regularly distributed across its entire cross-sectional area, the temperature and quantity of the drying gas being so selected that water ceases to be evaporated from the impregnated honeycomb structure after a period of 30 to 300 seconds, and the dried impregnated honeycomb structure is heat-treated over a period of 1 to 3 hours at tempertures of up to 1000° C.

Further preferred features of the process of this invention provide:

(a) for air to be used as the drying gas;
(b) for gas issuing from a burner to be used as the drying gas;
(c) for the burner gas to be used in admixture with cold gas for facilitating temperature adjustment.

The process of this invention permits noble metals and also non-noble metals, if desired, to be deposited satisfactorily in regular concentration on honeycomb structures in their axial and radial directions.

EXAMPLE 1

(Comparative Example)

79.75 g chloroplatinic acid (containing 40% Pt)
15.45 g rhodium chloride (containing 38% Rh)
704 g zirconium nitrate solution (containing 14.5% Zr)

were dissolved in water and the solution was made up to 2 liters. The solution had a density of 1.149 g/cm$^3$. It contained:

31.9 g Pt=1.388% Pt
5.87 g Rh=0.255% Rh
102.02 g Zr=4.44% Zr

A ceramic honeycomb weighing 725 g which had been coated with 16 wgt % $\gamma$-Al$_2$O$_3$ by dipping it repeatedly in a suspension of peptized aluminum oxide hydrate and annealing it at 600° C., was impregnated with the above solution. The honeycomb adsorbed 138.2 ml solution, corresponding to a noble metal quantity of 2.09 g Pt and 0.4 g Rh and 0.97 g Zr.

To remove adhering droplets, the honeycomb structure was blown out for a short while using air and it was then dried for 10 minutes at 100° C. in a drying cabinet. After annealing for 2 hours at 600° C., slices about 2 cm thick were cut from the outer and inner zones of the honeycomb which were tested for their metal content. The analytical data indicated heavy variations in the metal concentration determined for the outer zone and inner zone. In some individual cases, the outer zone was even found to contain Pt and Rh in a concentration up to 5 times higher than that found in the inner zone. In one case, the outer zone contained 4320 ppm Pt
790 ppm Rh
15600 ppm Zr and the inner zone contained:

2010 ppm Pt
450 ppm Rh
8000 ppm Zr

EXAMPLE 2

(Invention)

The procedure described in Example 1 was repeated but, for drying the honeycomb structure, it was placed on to the cone of a suitable funnel and, while it was repeatedly turned over, air at 20° C. was passed through several times, each time for 10 seconds. To this end, a dust suction apparatus with a suction capacity of about 600 normal m$^3$/h (measured at S.T.P.) was used. Next, hot air having a temperature of 300° C. was passed over 3 minutes through the honeycomb which was annealed for 150 minutes at 600° C. The metal contents were approximately identical, regardless of their local positions in the honeycomb.

|    | Outer zone | Inner zone |
| --- | --- | --- |
| Pt | 2910 ppm | 2870 ppm |
| Rh | 558 ppm | 550 ppm |
| Zr | 9800 ppm | 9790 ppm |

EXAMPLE 3

(Comparative Example)

70.75 g H$_2$[PtCl$_6$] (40% Pt)
15.45 g RhCl$_3$ (38% Rh)
324.2 g Ce(NO$_3$)$_3$.6H$_2$O (32.27% Ce)

were dissolved in water and the solution was made up to 2 liters. The solution had a density of 1.128 g/cm$^3$. It contained:

Pt=31.9 g=1.414% Pt
Rh=5.87 g=0.26% Rh
Ce=104.63 g=4.64% Ce

A honeycomb as used in Example 1 was impregnated with this solution. It adsorbed 139.5 ml solution and it was blown out as described in Example 1, dried in the drying cabinet, annealed, sliced and analyzed. Heavy variations in the metal concentrations determined for the outer zone and inner zone were found to exist.

|    | Outer zone | Inner zone |
|----|------------|------------|
| Pt | 3420 ppm   | 2900 ppm   |
| Rh | 640 ppm    | 550 ppm    |
| Ce | 10200 ppm  | 9500 ppm   |

EXAMPLE 4

(Invention)

Example 2 was repeated but the solution of Example 3 was used for impregnating the honeycomb. The metal concentrations determined for the outer zone and inner zone were substantially identical.

|    | Outer zone | Inner zone |
|----|------------|------------|
| Pt | 2890 ppm   | 2940 ppm   |
| Rh | 585 ppm    | 590 ppm    |
| Ce | 9950 ppm   | 9850 ppm   |

EXAMPLE 5

(Invention)

9.2 g H$_2$[PtCl$_6$] (40% Pt)=3.68 g Pt
1.9 g RhCl$_3$ (37.9% Rh)=0.72 g Rh
51.85 g Zr-nitrate solution (14.4% Zr)=7.52 g Zr
21.0 g Ce(NO$_3$)$_3$.6H$_2$O=6.78 g Ce were dissolved in water and the solution was made up to 250 ml. The solution had a density of 1.1418 g/cm$^3$ and a pH of about 1.

Specimens 2.5 cm wide and 7.52 cm long were bored from a ceramic honeycomb coated with 20.6% γ-Al$_2$O$_3$ and 3.01% CeO$_2$. The specimens had an average weight of 17.88 g and a water adsorbing power of 3.56 g.

Four specimens, each of which was impregnated with 60 g=52.54 ml of the above solution, were pre-dried for 5 seconds with air at 20° C. and freed from residual moisture by treating it for 1 minute with a stream of hot air at 250° C. After this drying treatment, each of the four bored specimens was found to contain about:

| Outer zone | Inner zone |
|------------|------------|
| 2860 ppm Pt | 2840–2900 ppm Pt |
| 560 ppm Rh | 530–580 ppm Rh |
| 5890 ppm Zr | 5750–5910 ppm Zr |

The specimens were not tested for their Ce-content because of the cerium contained in the γ-Al$_2$O$_3$-coating.

EXAMPLE 6

(Invention)

A ceramic honeycomb was dipped in 2 liter impregnating solution which contained 325.46 g Ce(NO$_3$)$_3$.6H$_2$O=105.02 g Ce
337.64 g Fe(NO$_3$)$_3$.9H$_2$O=46.68 g Fe
700.14 g Zr nitrate solution (20% ZrO$_2$)=103.66 g Zr
50.138 g H$_2$[PtCl$_6$] (40% Pt)=20.06 gPt Pt
10.59 g RhCl$_3$ (37.9% Rh)=4.014 g Rh had a density of 1.294 g/cm$^3$ and a pH of about 1. The honeycomb coated with 17.6% γ-Al$_2$O$_3$ weighed 815 g and had a water adsorbing power of 142 ml. After having been impregnated and freed from adhering doplets by blowing it out with air, the honeycomb presented a 184 g increase in weight, corresponding to 142.2 ml impregnating solution. Next, air preheated to 250° C. was passed over a period of 2 minutes through the impregnated honeycomb at a rate of 600 m$^3$/h (S.T.P.). The honeycomb so treated was annealed for 90 minutes at 600° C. The catalyst so made was regularly coated, independently of the place where the specimens were taken, with 0.88% Ce
0.39% Fe
0.88% Zr
1690 ppm Pt
340 ppm Rh Metal salts could not be found to have enriched due to wick effects, in peripheral zones.

EXAMPLE 7

(Invention)

Two impregnating solutions were prepared:

(A) 2000 ml solution (density=1.2316 g/cm$^3$; pH=1) containing 218.7 g Ce(NO$_3$)$_3$.6H$_2$O=86.69 g CeO$_2$
278.7 g Fe(NO$_3$)$_3$.9H$_2$O=38.53 g Fe=55.04 g Fe$_2$O$_3$
590 g Zr nitrate solution (14.5% Zr)=115.66 g ZrO$_2$
43.43 g H$_2$[PtCl$_6$] (40% Pt)=17.41 g Pt
8.56 g RhCl$_3$ (37.9% Rh)=3.24 g Rh and (B) 1500 ml solution (density=1.4083 g/cm$^3$; pH=1) containing 600.5 g Zr-nitrate solution (14.5% Zr)=87.07 g Zr=117.6 g ZrO$_2$
242.85 g Ce(NO$_3$)$_3$.6H$_2$O=78.36 g Ce=96.27 g CeO$_2$
215.64 g Ni(NO$_3$)$_2$.6H$_2$O=43.54 g Ni=55.4 g NiO
314.9 g Fe(NO$_3$)$_3$.9H$_2$O=43.54 g Fe=62.2 g Fe$_2$O$_3$
40.97 g H$_2$[PtCl$_6$] (40% Pt)=16.39 g Pt=16.39 g Pt
8.65 g RhCl$_3$ (37.9% Rh)=3.28 g Rh=3.28 g Rh.

The solutions were used for impregnating ceramic honeycombs coated with aluminum oxide; the solutions were used as follows:

|  | Solution A | Solution B |
|---|---|---|
| Weight of honeycomb | 770.1 g | 766.0 g |
| Al$_2$O$_3$-coating | 17.52% | 17.56% |
| Water adsorbing power | 159.5 ml | 133.1 ml |
| Weight of honeycomb after impregnating, drying and annealing | 809.7 g | 814.7 g |

The honeycombs were dried over a period of 2 minutes in a stream of hot air at 250° C. which was used at a rate of 600 m$^3$/h(S.T.P.) and annealed for 2 hours at 200° C. Even in the case of solution B presenting the high metal salt concentration, the peripheral zones could not be found to have become encrusted by salt concentrating under wick effects. The metal concentrations in the outer and inner zones were approximately identical. The following quantities of metal were found to have been adsorbed:

|  | From solution A | From solution B |
|---|---|---|
| $CeO_2$ | 6.91 g = 0.846% $CeO_2$ | 8.54 g = 1.07% $CeO_2$ |
| $ZrO_2$ | 9.22 g = 1.13% $ZrO_2$ | 10.43 g = 1.30% $ZrO_2$ |
| $Fe_2O_3$ | 4.38 g = 0.536% $Fe_2O_3$ | 5.51 g = 0.69% $Fe_2O_3$ |
| Pt | 1.39 g = 0.17% Pt = 1702 ppm | 1.454 g = 0.182% Pt = 1822 ppm |
| Rh | 0.258 g = 0.031% Rh = 316 ppm | 0.291 g = 0.036% Rh = 364 ppm |
| NiO | — | 4.91 g = 0.615% NiO |

EXAMPLE 8

(Comparative Example)

An aqueous solution of $H_2[PtCl_6]$, $RhCl_3$ and $Ce(NO_3)_3$ in a weight ratio of Pt:Rh:Ce=5:1:32 was stirred into an ammoniacal solution of nitrilotriacetic acid adjusted to a pH of 10; the pH was maintained constant by continuously adding ammonia, the molar ratio of (Pt+Rh+Ce):NTE being 1:2. The whole was diluted with water and an impregnating solution containing, per liter, 5000 mg Pt, 1000 mg Rh and 32 500 mg Ce was obtained.

The honeycomb was a cordierite structure provided with an intermediate coating of 22.3 wgt % $\gamma$-$Al_2O_3$ which had a volume of 1.24 l and, after it had been annealed at 600° C., a BET-surface area of 30 $m^2/g$. The ammoniacal solution was passed continuously over a period of 1 minute through the honeycomb. The honeycomb had a water adsorbing power of 145 ml and was theoretically capable of adsorbing during the impregnation 725 mg Pt, 145 mg Rh and 4713 mg Ce or, based on the 650 g weight of the honeycomb 1115 ppm Pt
223 ppm Rh
7248 ppm Ce.

After drying for 10 hours in the drying cabinet at 100° C., the outer zone of the honeycomb was found to contain 2650 ppm Pt and 560 ppm Rh.

EXAMPLE 9

(Invention)

Example 8 was repeated but the impregnated honeycomb was dried by initially blowing air at room temperature over a period of 10 seconds and then air preheated at 250° C. over a period of 2 minutes through it.

After drying, the outer zone of the honeycomb was found to contain 1225 ppm Pt and 310 ppm Rh.

EXAMPLE 10

(Invention)

352 g solid nitrilotriacetic acid was stirred into a solution of
143.6 g $Ce(NO_3)_3.6H_2O$
320.0 g $Zr(NO_3)_4$
22.03 g $H_2[PtCl_6]$
4.65 g $RhCl_3$
and ammonia was added until all had been dissolved. A further quantity of aqueous ammonia was added to establish a pH of 10 and the whole was made up to 2 liters. The clear yellowish solution contained 4.41 g Pt, 0.88 g Rh, 32.0 g $ZrO_2$ and 28.5 g $CeO_2$ per liter.

The impregnating solution was allowed to flow over a period of 1 minute through a ceramic honeycomb which was coated with 18 wgt % $\gamma$-$Al_2O_3$ and had a total weight of 850 g, a volume of 1.24 l and a water adsorbing power of 165 g. Next, the honeycomb was dried by blowing air preheated to 250° C. through it over a period of 90 seconds at a rate of about 600 $m^3/h$ (S.T.P.), and annealed for 2 hours at 550° C.

After this had been done, the impregnating solution was allowed to flow once again through the honeycomb and the drying and annealing steps were repeated. 1.45 g Pt, 0.29 g Rh, 0.9% Ce and 0.9% Zr were found to have been applied to the honeycomb. The metal concentrations in the outer and inner zones were approximately identical.

|  | Outer zone | Inner zone |
|---|---|---|
| Pt | 1680 ppm | 1720 ppm |
| Rh | 320 ppm | 345 ppm |

EXAMPLE 11

(Invention)

430 g solid $N(CH_2COOH)_3$ was stirred into a solution of
171 g $Ce(NO_3)_3.6H_2O$
382 g $Zr(NO_3)_4$
14 g $H_2[PtCl_6]$
28 g $PdCl_2$
and a concentrated aqueous ammonia solution was added until all had been dissolved and a pH of 10 established. The whole was made up to 2 liters.

A honeycomb having a total weight of 800 g, coated with 16% $\gamma$-$Al_2O_3$ and having a water adsorbing power of 130 g was treated with the aqueous solution, dried and annealed as described in Example 10.

The honeycomb so impregnated contained (tolerance±5%)
0.72 g Pt=900 ppm Pt
0.72 g Pd=900 ppm Pd
0.9% Ce=9000 ppm Ce
0.9% Zr=9000 ppm Zr
both in its outer and inner zones.

We claim:
1. A process for making a carrier-supported catalyst wherein a ceramic honeycomb structure having a layer of a heat resistant metal oxide applied to it is impregnated with the aqueous solution of a compound of at least one metal selected from platinum, rhodium or palladium, the impregnated honeycomb structure is dried and annealed, which comprises: flowing a drying gas through the impregnated honeycomb structure, regularly distributed across its entire cross-sectional area at a temperature of from 20° to 400° C., the temperature and quantity of the drying gas being so selected that water ceases to be evaporated from the impregnated honeycomb structure after a period of 30 to 300 seconds and heat-treating the dried impregnated honeycomb structure over a period of 1 to 3 hours at temperatures up to 1000° C.

2. The process as claimed in claim 1, wherein the aqueous solution is used in admixture with a salt of a non-noble metal.

3. The process as claimed in claim 1, wherein air is used as the drying gas.

4. The process as claimed in claim 1, wherein gas issuing from a burner is used as the drying gas.

5. The process as claimed in claim 1, wherein the burner gas is used in admixture with cold gas for temperature adjustment.

* * * * *